(12) United States Patent
Henry et al.

(10) Patent No.: US 8,849,027 B2
(45) Date of Patent: Sep. 30, 2014

(54) WEB-BASED COLOR SELECTION SYSTEM

(75) Inventors: Michael J. Henry, Hinckley, OH (US);
Beth C. Ramsey, Strongsville, OH (US);
John E. Beran, Allison Park, PA (US);
Francis J. Groves, Finleyville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 216 days.

(21) Appl. No.: 13/342,283

(22) Filed: Jan. 3, 2012

(65) Prior Publication Data

US 2012/0170836 A1    Jul. 5, 2012

Related U.S. Application Data

(60) Provisional application No. 61/429,642, filed on Jan. 4, 2011.

(51) Int. Cl.
*G06K 9/00* (2006.01)
*G06K 9/40* (2006.01)
*G01J 3/52* (2006.01)
*G06F 3/048* (2013.01)
*G01J 3/46* (2006.01)
*G03F 3/08* (2006.01)

(52) U.S. Cl.
CPC . *G06F 3/048* (2013.01); *G01J 3/52* (2013.01); *G01J 3/463* (2013.01); *G01J 3/462* (2013.01)
USPC ........... 382/167; 382/254; 358/518; 358/520; 358/521

(58) Field of Classification Search
None
See application file for complete search history.

(56) References Cited

U.S. PATENT DOCUMENTS

| | | | |
|---|---|---|---|
| 5,739,806 A * | 4/1998 | Hissen et al. | 715/229 |
| 6,717,584 B2 | 4/2004 | Kulczycka | |
| 6,914,613 B2 | 7/2005 | Marchand et al. | |
| 6,973,211 B2 | 12/2005 | McClanahan et al. | |
| 6,977,650 B2 | 12/2005 | Voye et al. | |
| 7,106,343 B1 * | 9/2006 | Hickman | 345/589 |
| 7,145,656 B2 | 12/2006 | Rodrigues et al. | |
| 7,337,162 B2 | 2/2008 | Lewis | |
| 7,466,415 B2 | 12/2008 | Gibson et al. | |
| 7,743,055 B2 | 6/2010 | Rodrigues et al. | |

(Continued)

FOREIGN PATENT DOCUMENTS

WO    WO 9220024 A1 * 11/1992

OTHER PUBLICATIONS

Jay Joichi: "Imrpoving Color Exploration and Visualization on the ColorSmart by BEHR™ Application", Proceeding DUX '05 Proceedings of the 2005 Conference on Designing for User Experience Article No. 4, Jan. 1, 2005, retrieved from the internet: URL:http://delivery.acm.org/10.1145/1140000/1138240/a4-joichi.pdf?ip=145.64.134.245&acc-ACTIVE.

*Primary Examiner* — Matthew Bella
*Assistant Examiner* — Jose M Torres
(74) *Attorney, Agent, or Firm* — Robert P. Lenart (57) ABSTRACT

An apparatus includes a database having a plurality of digital color images and a neutral gray background value for each of the images; a processor configured to receive search criteria and to identify one or more of the digital color images meeting the search criteria; and a display configured to display at least one of the identified digital color images on a neutral gray background, wherein the brightness of the neutral gray background is determined by the neutral gray background value for the image being displayed. A method performed by the apparatus is also provided.

33 Claims, 8 Drawing Sheets

(56) References Cited

U.S. PATENT DOCUMENTS

| | | |
|---|---|---|
| 7,859,545 B2 | 12/2010 | Tokunaga |
| 7,999,825 B2 * | 8/2011 | Webb et al. ................... 345/594 |
| 8,319,788 B2 * | 11/2012 | Buzyn et al. ................... 345/594 |
| 2001/0041966 A1 | 11/2001 | Corrigan et al. |
| 2006/0001677 A1 | 1/2006 | Webb et al. |
| 2007/0032965 A1 | 2/2007 | McClanahan et al. |
| 2009/0183122 A1 * | 7/2009 | Webb et al. ................... 715/840 |
| 2009/0295823 A1 | 12/2009 | Henry |
| 2010/0194776 A1 | 8/2010 | Chong et al. |
| 2010/0235400 A1 | 9/2010 | Myers et al. |

* cited by examiner

COLOR A    COLOR B

FIG. 4

COLOR A    COLOR B

On-line Color Formulations

| Source Type | Manufacturer | | Color |
|---|---|---|---|
| Motor Manufacturers | GM (N AMERICA) | | 908587-VELOCITY YELLOW |

Standard search

Competitor search

Select paint system
DELTRON 2000 DBC-SOL

Select a variant

Preferences

| Variant | Description | Type | Most Popular Match | Additional Information |
|---|---|---|---|---|
| PRIME | Prime / No 1 | | | |

Reporting

[Show All Specials]  [Show Specials with Vehicle Details]

*FIG. 12*

WEB-BASED COLOR SELECTION SYSTEM

CROSS-REFERENCE TO RELATED APPLICATION

This patent application claims the benefit of U.S. Provisional Patent Application Ser. No. 61/429,642 filed Jan. 4, 2011, and titled "Web-Based Color Selection System," which is incorporated herein by reference.

FIELD OF THE INVENTION

This invention relates to systems and methods for selecting colors.

BACKGROUND OF THE INVENTION

In the automotive repair industry, several tools are used to assist the repair technician in identifying the correct color for a vehicle repair. Currently, paint manufacturers assist the paint technician with color books that show paint chips representing the array of original equipment (OE) colors per model year and those colors that carry over from previous years. These color books show both body and non-body colors and include information organized by the original equipment manufacturer and are printed once a year and organized by domestic and import brand vehicle manufacturers. The color selection is done by flipping pages in a book to find the chip that best represents the vehicle color. Key color information can then be used with a color software program to begin searching for a color formula in the correct paint system to use for the repair.

Additional information is used to narrow the color search in the color book—typically the original equipment manufacturer (OEM), vehicle model, model year and color code. Once the correct paint chip for the vehicle body color and corresponding information is determined, there is additional compatible information about that vehicle color that may need to be found—accent, interior, underhood and wheel color data, for example. When the correct color identification is made, the correct paint formulas can be found using the key color information and a software program can be used to retrieve a paint formula for the vehicle repair.

Since color books are printed only once per year, key vehicle data may be missing, which will delay the search by the end user. In addition, not all users have access to this information due to limited circulation of the color books and therefore, information cannot be referenced immediately.

Improved methods and apparatus for selecting color are desired. Moving the color selection and identification process to a web-based application will allow for more current and updated information available to the repair technician. The web application can reach a broader end user population. Digital color images can be viewed to confirm that the correct vehicle color has been selected. Current digital color image displays have been presented with either a white or black background color. This approach will not provide an adequate perception of the color, therefore, an improved background viewing color scheme is needed.

SUMMARY OF THE INVENTION

An apparatus includes a database having a plurality of digital color images and a neutral gray background value for each of the images; a processor configured to receive search criteria and to identify one or more of the digital color images meeting the search criteria; and a display configured to display at least one of the identified digital color images on a neutral gray background, wherein the brightness of the neutral gray background is determined by the neutral gray background value for the image being displayed.

A computer implemented method includes providing a database having a plurality of digital color images and a neutral gray background value for each of the images; using one or more search criteria to identify one or more of the digital color images; and displaying at least one of the identified digital color images on a neutral gray background, wherein the brightness of the neutral gray background is determined by the neutral gray background value for the image being displayed.

In another aspect, a computer implemented method includes providing a database of digital images of colors and metadata relating the images to vehicle information and color usage; using one or more search criteria to identify one or more of the digital image colors; displaying the digital images of the identified colors; selecting a color of interest from the displayed colors; using the metadata to identify additional information related to the color of interest; displaying the digital image of the color of interest and the additional information; and using the displayed digital image of the color of interest and the additional information to make a final color selection.

DETAILED DESCRIPTION OF THE INVENTION

In an automotive application, the color selection system provides a computer-implemented method for users to access and select colors and/or paint formulas. Color information can be stored in a database that includes high resolution digital representations (i.e., images) of color chips, panels or color swatches as well as additional information (e.g., metadata) pertaining to each color. The additional information may include vehicle specific information to assist in color selection. The database of color images can be stored in a memory of a computer server or other type of processing device. In one embodiment, a web-based color search and formula retrieval tool provides a visual representation of color(s) on a display and associates the color(s) with relevant compatibility information for the purpose of quick and easy color identification and selection.

Figure 1:
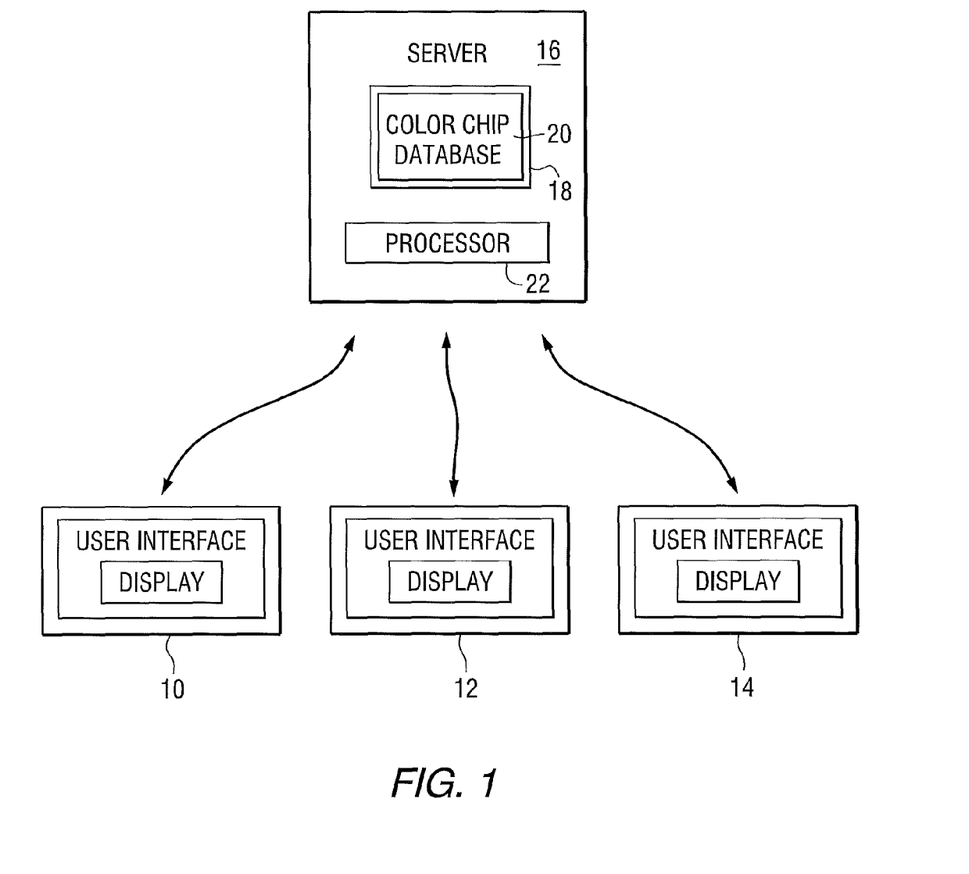
FIG. 1 is a schematic block diagram of a system that can be used to practice an embodiment of the invention.

FIG. 1 is a block diagram of one implementation of the system. In the example of FIG. 1, a plurality of users have access to a computer, terminal, tablet computer, smart phone, PDA, or other device 10, 12 or 14 having a user interface that allows the users to enter information and includes a visual display. The user device can communicate, for example, over the Internet or another network with a server or other information processing device 16 including a memory 18 for storing a color image database 20 and a processor 22 adapted to receive user requests and to search the database to obtain color information in response to the user requests. The user initiates a request at the user device and the request is transmitted to the server. The server searches the database to obtain information from the database. The search request can be transmitted using a variety of computer based protocols. The returned information is transmitted to the user and displayed at the user location. The returned information can be transmitted to the user device, for example, in an XML format, and can include image data in several file formats such as png, bmp, jpeg, gif, etc. of color chips, panels or swatches. However, the system is not limited to any particular data transmission protocol or image format.

Figure 2:
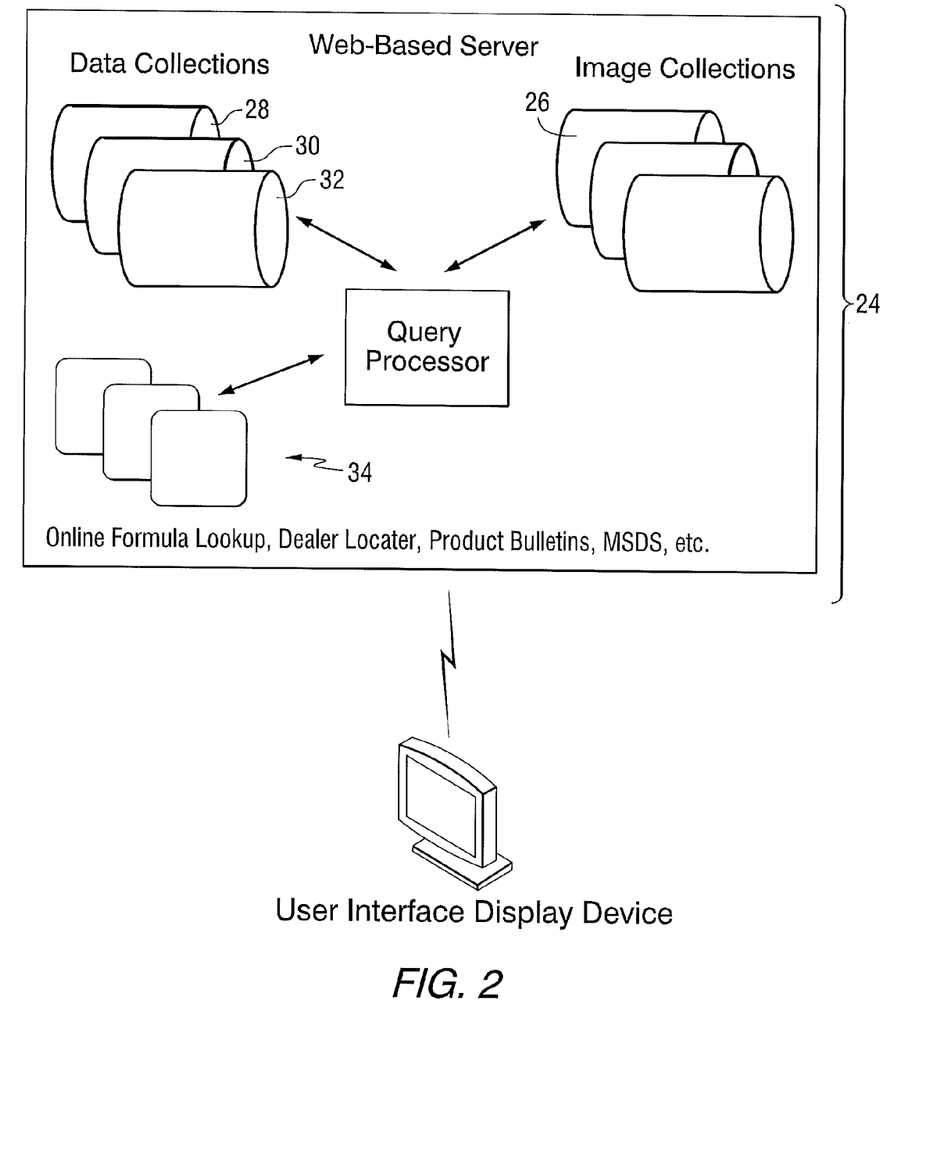
FIG. 2 is a schematic diagram of a database structure.

The digital representations of colors and the associated information, in the form of metadata, are stored in a database. FIG. 2 is a schematic representation of the database structure. The database 24 includes a plurality of collections of information. Such collections include a collection 26 of high resolution images, a collection of colors by model 28, a collection of colors by usage 30, and model/usage compatibility collections by color 32. A collection is attribute descriptive data which associates with the digital color image. More than one collection is desirable to describe an image. Having many collections allows the user to search on multiple criteria and retrieve the necessary information quickly and accurately. Many collections provide the benefits of speed, endless search potential, and multiple search criteria/grouping of information in one visual representation on screen. The database can also include additional information 34, such as: online paint or color formula information; dealer location information; product bulletins; material safety data sheets; etc., or links to sites where such information can be obtained.

To populate the image database, digital color images can be captured using a known (e.g., commercially available) image capture device such as but not limited to, a flatbed scanner or digital camera. The starting material to be scanned can be a vehicle part, an OEM metal part or OEM color standard, a laboratory spray out panel, color chip stock that has been sprayed with actual paint or any other coated article. For scanned images, the desired image resolution, for example, DPI (dots per inch) or PPI (pixel per inch) setting can be determined. Typical image resolution can be in a range from 72 DPI to 1200 DPI. The image output dimensions can also be determined, for example, 2 inch by 2 inch when using the DPI resolution settings. The captured image may be processed using a known (e.g., commercially available) image manipulation software such as but not limited to, e.g., PhotoShop, to obtain a processed image. To perform the image processing, an editor who is able to accurately appraise color can make decisions about if and how the image should be created and potentially modified to visually represent the coated article on a visual display. Daylight illumination can be established to view the coated article when compared to the digital color image on a calibrated and color corrected monitor. Several computer monitor correction devices and software programs are available to maintain a high level of color accuracy in the image capture process. A desired viewing angle/geometry can be established, for example, the daylight illumination angle and angle of the coated article to best simulate the effect pigmentation visual response. The commercially available manipulation software can be set up with the proper resolution and background viewing color. The editor can manipulate the originally scanned or digitally photographed image to meet visual approval using the features of the commercially available software. The final image can be assigned a file name and file format. The final approved image is stored in an image database to be used with various data collections.

The color image appraisal/color approval process can include the selection of a neutral gray background corresponding to a visual lightness or darkness of the initial color image. This neutral gray background can be used to determine the image's acceptability to the physical sample. There can be at least three neutral gray backgrounds, with distinct levels of lightness value that the color image editor can select, for example, dark gray, mid-gray and light gray. The use of neutral gray backgrounds for judging differences of colored articles is a long standing industrial practice. Viewing color against neutral backgrounds minimizes the influence that other colors have on the perception of the three basic color attributes, hue, value and chromaticity. Hue is an attribute of color that is perceived as red, yellow, green, blue, purple, etc. Value is the lightness or darkness of a color, and chromaticity is the attribute of color associated with the perception of saturation or departure from gray. The terms hue, value and chroma are in common use to describe color in both art and industry. Selecting a gray background of similar lightness value as the digital color image being edited avoids perceptual changes and mistakes associated with simultaneous contrast caused by the background being too light or too dark relative to the value of the digital color image.

Figure 3:
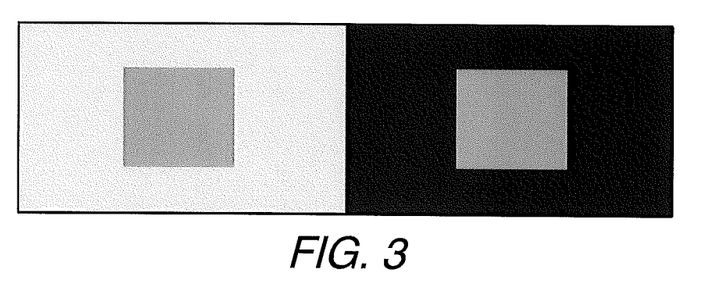
FIGS. 3-8 are representations of varying effects of color images displayed on different background colors.
Figure 4:
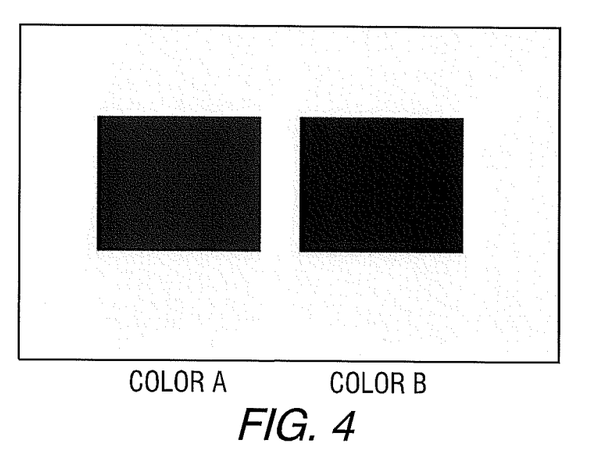
Figure 5:
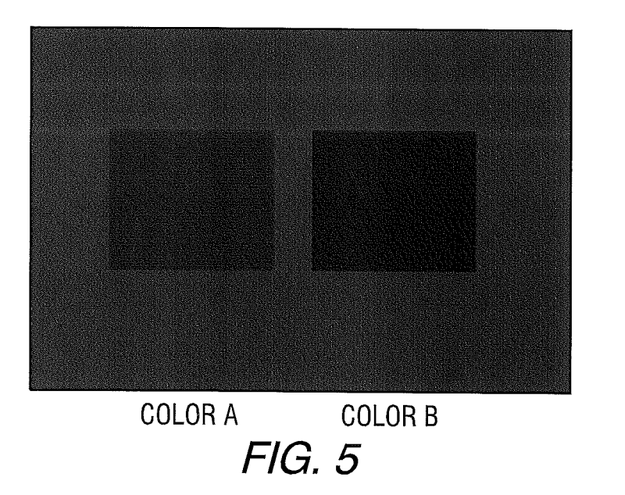

FIG. 3 illustrates the phenomenon of simultaneous contrast that causes an observer to perceive colors differently dependent on adjacent colors. Michel Eugene Chevreul described the phenomena in 1839 in relation to his observation of how some colors seem brighter and more intense when placed side by side. Chevreul's work described how complementary colors such as red and green, or yellow and purple will modify our perception of their hue and apparent chromaticity from our perception of them if viewed in isolation. Simultaneous contrast also shifts the perception of color lightness and hue for colors when viewed against backgrounds of similar and different lightness-darkness value relative to the color being viewed. FIG. 4 shows how the difference between color A and color B is diminished when viewed against a background of high contrast compared to the two colors. FIG. 5 demonstrates that color A and color B appear different when viewed against a gray background that is similar in value to the two colors.

Figure 6:
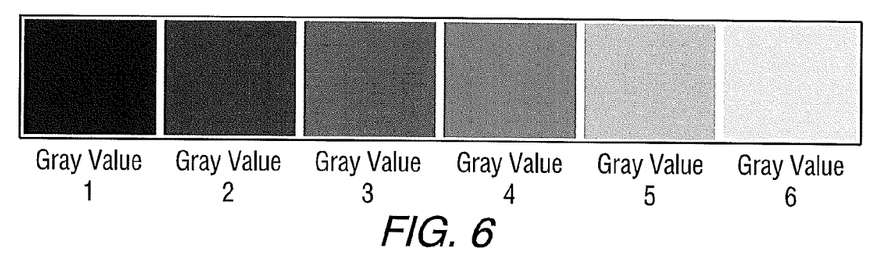

An optimized set of backgrounds used for the display of automotive digital color images may include up to six available neutral gray shades. An expanded set could include seven or more neutral gray shades. FIG. 6 shows six neutral gray backgrounds which can be identified using the whole numbers 1, 2, 3, 4, 5 and 6 that correspond to a scale represented by six equal steps of neutral grey, ranging from Gray Value 1 comprised of a dark gray roughly equivalent to a Munsell color notation of N3, through incremental steps of graduating lightness, terminating in Gray Value 6, a very light gray roughly equivalent to a Munsell color notation of N8. Munsell notations are analogous for the gray scale values 1 through 6 to define the visual appraisal backgrounds that can be used in the adjustment and approval of the digital color images. The correct background is selected for each digital color image and the gray scale value of the background is documented and assigned as a tag to that image and entered into the database.

Those skilled in the art will recognize that there are multiple ways to assign a corresponding neutral gray value to a digital image for use in a display. Once such method might use the RGB values of the image and match them to a neutral gray of the same RGB. Another approach would be to use the RGB of the image and convert it to L*a*b* values that correspond to the L*a*b* values of the physical sample the digital image represents. Another method might be to use the L*a*b* of the physical sample and convert that to RGB and use the RGB values to select a corresponding neutral gray rationalized for the RGB range. Other methods are also possible and the method of this invention is not limited to any particular technique for assigning corresponding neutral gray values.

Figure 7A:
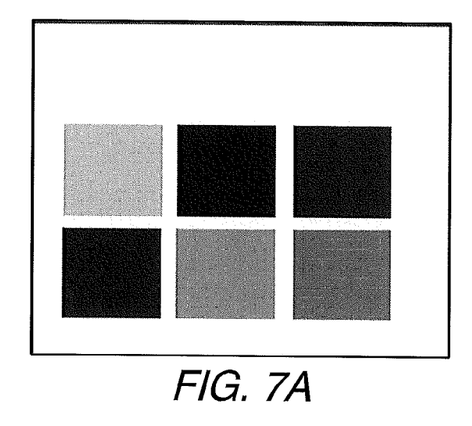
Figure 7B:
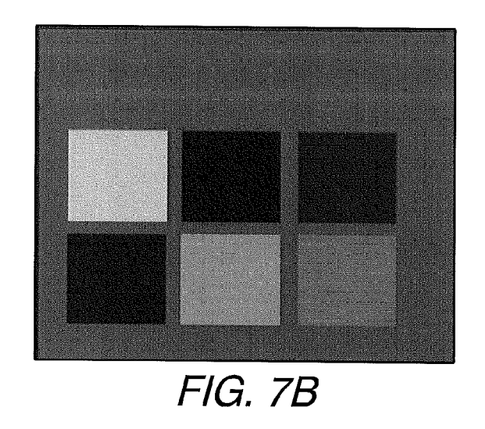
Figure 8A:
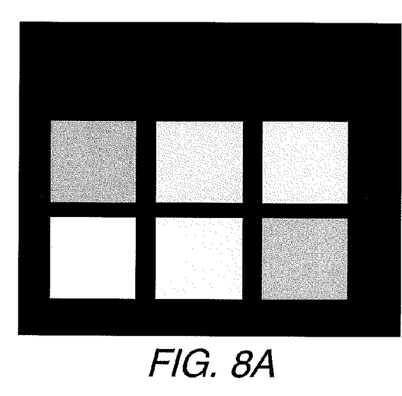
Figure 8B:
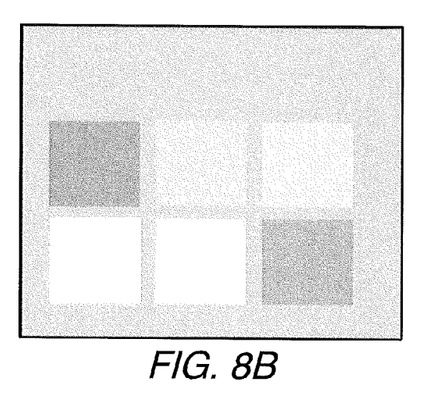

The use of corresponding neutral gray backgrounds improves the correlation and accuracy of the digital representation of color to the physical color sample. This method takes into account the phenomena of "simultaneous contrast" and the related phenomena, the "crispening effect." Simultaneous contrast causes an observer to perceive colors differently depending on what colors they are adjacent to, or surrounded by. The use of a neutral gray background with the display of the digital color image allows truer perception of color than if the digital color image was displayed just on a white or black background. Providing a neutral background of similar lightness value to a set of color images allows for the enhanced perception of subtle differences between colors of the displayed set of digital color images. The process can improve the end user's color selection that corresponds to the vehicle undergoing repair. FIGS. 7a and 7b demonstrate the effect of mid value colors displayed on a standard white background versus the same mid value colors displayed on a gray background that has been calculated by using the averages of the gray rankings of the displayed images. There is better color discernment of the darker colors when viewed with the calculated correct gray background. Likewise, FIGS. 8a and 8b demonstrate the effect of light value colors displayed on a standard black background versus the same light value colors displayed on a gray background that has been calculated by using the averages of the gray rankings of the displayed images. In this example, there is better color discernment of the lighter colors when viewed with the calculated correct gray background.

The enhanced sensitivity to color differences by using backgrounds of similar lightness value of the displayed images is called the "crispening effect." It is a human visual system phenomenon that causes a change of perception of color differences due to changes in background color. If a white background is used to view two medium dark color images of near equal lightness (FIG. 4), the observer's ability to differentiate between the two is compromised by the large tonal value difference between the background and the color images. Similarly, if two lighter color images of near equal lightness are viewed against a dark background, the observer's ability to differentiate between these two images is also compromised. By selecting a neutral gray of similar lightness/darkness value to the images, the crispening effect takes place and enhances the viewer's sensitivity to the differences between the two images (FIG. 5). The editor or color approver can take advantage of the crispening effect to make better decisions prior to the digital color image release to the database. The customer or end user of the image database can then make better selections based on the optimization of the correlation of the background's tonal lightness value to the images in the display area.

In one embodiment, the background can be homogeneous in tonal value and not graduated or mottled in any fashion. By not graduating or mottling the background, this method reduces any misjudgments caused by confusion about the relative lightness or darkness of an image.

It is understood that viewing digital color images is influenced by many factors (e.g., the computer monitor, graphic card, viewing conditions, etc.). It is recognized that end users may perceive digital color images differently dependent upon the display capabilities of the hardware used to retrieve and view the images. The display devices used to appraise, adjust and approve the digital color images can be calibrated using a commercially available display calibration device such as, but not limited to, an X-Rite Huey before each use. Calibrating the display in this fashion maintains the relative color consistency between images as they are approved and added to the database over time.

The digital color images in the database can relate to model collections that relate to manufacturer vehicle model names. A "table" of attribute descriptive data can be created per image. A search of digital images by model can provide the user the ability to search by manufacturer and focus at the model level. The selected image can then be linked to the corresponding usage information.

The color by usage collection relates the digital image colors to the manner in which such colors have been used, for example, as colors for ancillary components of a vehicle. A search of digital images by usage can provide the user with the ability to search by manufacturer and focus at the usage level. The selected image can then be linked to the corresponding model information.

Following a work flow similar to using a color book, an end user such as a paint technician, estimator, store manager or the like can select an OE color and request to see the ancillary compatibility colors. Digital color images of the accent, interior, underhood and wheel colors can be retrieved with the OE name or paint formula codes. The database can be searched by multiple queries, including but not limited to, OE color code, color family, model year, brand code, solid, metallic and usage.

In one aspect, the system provides the ability to integrate high resolution images of automotive refinish colors with a collection of specific descriptive data related to the colors. This system can also enable the user to quickly identify the compatible colors that are associated with the selected color.

The high resolution images can be grouped in different "collections" based on a segment category in which the image represents (e.g., Collision, Custom, Motorcycle, Historical, Commercial, etc.). Each "collection" can be further categorized by a set of descriptive data (metadata) that facilitates the selection of a color. Metadata for an image could include: Manufacturer, Model Year, Usage type, OEM Code, Brand Code, Color Family, type of Finish Effect, Model, a query to Compatibility Information, a Link to Online Formulation and/or a Link to Product information, Technical data, Ready to Spray data, and/or MSDS information.

The Manufacturer data identifies the Original Equipment Manufacturer (OEM) which built the original vehicle (GM, Ford, Chrysler, etc.). The Model Year data identifies the calendar year the vehicle was manufactured. The Usage type data identifies the area or components of the vehicle where the color is applied (e.g., accent which can be bumper, trim and grille information; interior; underhood; wheel, etc.). The OEM Code data identifies the unique code assigned to the color by the manufacturer including two-tone colors. The Brand Code data identifies the unique code assigned to the color by the paint manufacturer. The Color Family data identifies the chromatic color family that the color is assigned to (red, blue, green, etc.). Colors that are used in association with each other, known as multi-tones, can also comprise a unique type of color family. The Finish Effect data identifies a visual characteristic of the paint (solid, metallic, etc.). The Model data identifies the unique name assigned to the vehicle by the manufacturer (Mustang, Wrangler, etc.). The Compatibility Information data contains compatibility information that enables the user to view all compatible colors associated with the selected color (e.g., accent, interior, underhood wheel, etc.). A Link to an Online Formulation database provides a portal to the specific paint formula/recipe that is used to create the paint color specific to the paint system selected by the end user.

A software program with a user interface coupled with a color display can be used to browse, sort and define searches for digital color images based on the information/metadata associated with the digital color image. This enables the user to focus on identifying the color image via selecting specific information about the color. The software allows the user to define the criteria of the search based on the associated metadata, such as, manufacturer, model year, model, finish effect, usage, etc.

The user can initiate a search for digital color images with as minimal input as selecting a segment and an OEM color code or paint company brand code. The user could initiate a search for digital color images by selecting a segment and model year. Alternatively, the user can initiate a search selecting a segment and manufacturer. These simple searches will activate the display of all digital color images with metadata in all collections in that product segment identified with that selected attribute.

Because the number of images displayed by simple searches use only two or three attributes as search criteria can be large, the user is provided with the option to refine the search by selecting any number of additional attributes of the color, such as segment, model year, finish effect, color family, etc. The more detailed the search criteria identified by the user, the fewer and more specific the displayed digital color images will be returned. In addition, once a specific color is identified and selected, the software would enable the user to take one or more different actions based upon that color including: isolating and viewing of that color; the display of the digital color images representative of compatible colors used for ancillary components; and via links to other databases, the identification of places to purchase paint, the paint formulation itself and the like.

When multiple digital color images are defined via the search criteria and displayed for the user, the gray value ranking for the background on which they are presented is calculated by averaging the images tagged background rankings. An average of image rankings calculation can be performed by adding the image rankings values and dividing that number by the number of images displayed. If the average results in a whole number plus a fraction, then the number is rounded down and the background that is darker than the true average is presented with that image set. The further the user refines the search the fewer images will be presented in the display area and the background gray value ranking can be recalculated based on the gray value ranking associated with the reduced number of images presented. This correlation of the background to the images displayed minimizes the negative perceptual effects associated with simultaneous contrast and allows the benefits of the crispening effect.

Alternately, a user could initiate a search for digital color images by selecting a segment and model year and color family or by selecting a segment and model year and color family and finish effect. This type of search will display all the colors of the specified color family, red, blue, yellow, etc., and finish effect, metallic, pearl, solid, meeting the model year criteria. Those skilled in the art will recognize an opportunity to minimize user perceptual errors when viewing colors of similar hue by applying a hue identification function in addition to the lightness darkness scaling function to automatically select the best background for viewing this particular set of color images. If color hue identification is to be added as a function of background determination, the color editor can assign a color hue number ranking to the image at the time the Gray Value ranking is assigned to the approved image. In this method, each image will be tagged with both the gray value ranking and a hue identification number. A hue number can be given to the hues described on a common color wheel. A numbering scheme for hues can also be described such that Red=1, Red-Yellow=2, Yellow=3, Yellow-Green=4, Green=5, Green-Blue=6, Blue=7, Blue-Purple=8, Purple=9 and Purple-Red=10.

Each one of the hue backgrounds can be divided into six separate background colors of incrementally graduated lightness and assigned both a hue number and a Gray Value ranking. The backgrounds available for colors displayed from color family searches could be potentially viewed on one of six possible backgrounds of graduated lightness starting with the darkest background for the color tagged with a Gray Value 1 and the specific hue number. For example, if multiple red color family images are displayed and their averaged Gray Value ranking is 3, the background presented would be identified as having a hue number 1 and Gray value 3. If multiple Blue-Green color family images are displayed and their averaged Gray Value ranking is 2, the background presented would be identified as having a hue number 6 and Gray value 2. In this manner, the gray value rankings are averaged to determine the correct background to display from the set of six possible backgrounds for each of the ten hues. If only one color image is displayed after narrowing a color family to a single image, the background presented would be identified as having the same Hue number and Gray Value ranking as tagged to the digital color image. For the convenience of the user, an interface feature can be provided in the software to allow the user to elect to override the color family backgrounds and display the color images with only the Gray Value background if desired. Alternatively, the user can elect to not to use the Gray Value background, and instead use a white or black background.

Those skilled in the art may also recognize that adjusting the background for chroma might enhance the benefits of the crispening effect. If chromatic scaling was used in combination with value scaling and hue identification, chromatic rankings would also need to follow the value ranking schema by adding a third tagged value to the digital color image and incorporating the average of the images to be displayed into the identification of the background to be presented. In this embodiment, as few as two or as many as eighteen or more chroma value rankings might be used. One optimized set might include only five and be roughly analogous to Munsell chroma values of C4, C8 or C12.

A software program is used to display, search and sort the digital color images upon the image information/metadata thereby enabling the users to focus on the identification and selection of key color information. The software program is not intended to be used as a color matching tool and it is not intended to allow users to compare and contrast multiple color images representing formula variations and/or alternatives for the same paint color on a display. It is understood that the accuracy of color on a display monitor will vary with monitor type, age and resolution. The software program would enable the viewing of all colors in a specific color collection or palette; and the selection of specific criteria based upon the metadata that would result in the retrieval and displaying of only those colors meeting that criteria. In addition, once a specific color is identified, the software would enable the user to take one or more different actions based upon that color including: the visualization of that color using a color visualization software program; the display of the digital images for paints used on auxiliary components; and the identification of places to purchase paint, the paint formulation itself and the like.

In various embodiments, high quality digital color images can be captured and used in a searchable web-based catalog of the OEM collision, custom, motorcycle, historical and commercial/fleet colors. A web-based system provides a broad set of users with an easy solution to finding information relevant to specific automotive OE, custom, motorcycle, historic and commercial/fleet colors, or colors used in other industries. The database may contain digital color images that can be linked to data identifying vehicle manufacturer, model year, and vehicle models that the color was available on, as well as compatible accent, interior, underhood, and wheel colors. Images of the colors are stored in, and retrievable from, the database. Custom, motorcycle, historic and commercial colors can also be linked to multiple associated information, paint formulas, product information, technical data and other information to achieve desired finish effects.

Figure 9:
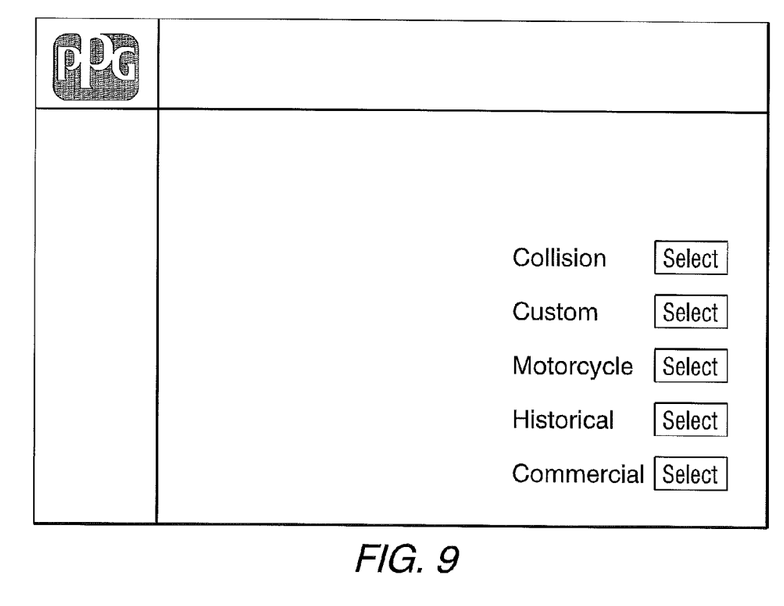
FIGS. 9-12 are representations of various screen displays.

In one embodiment, when a user accesses the system, a welcome screen display such as the screen in FIG. 9 would appear. In this screen, the user can select an application segment, for example, Collision, Custom, Motorcycle, Historic, or Commercial.

Figure 10:
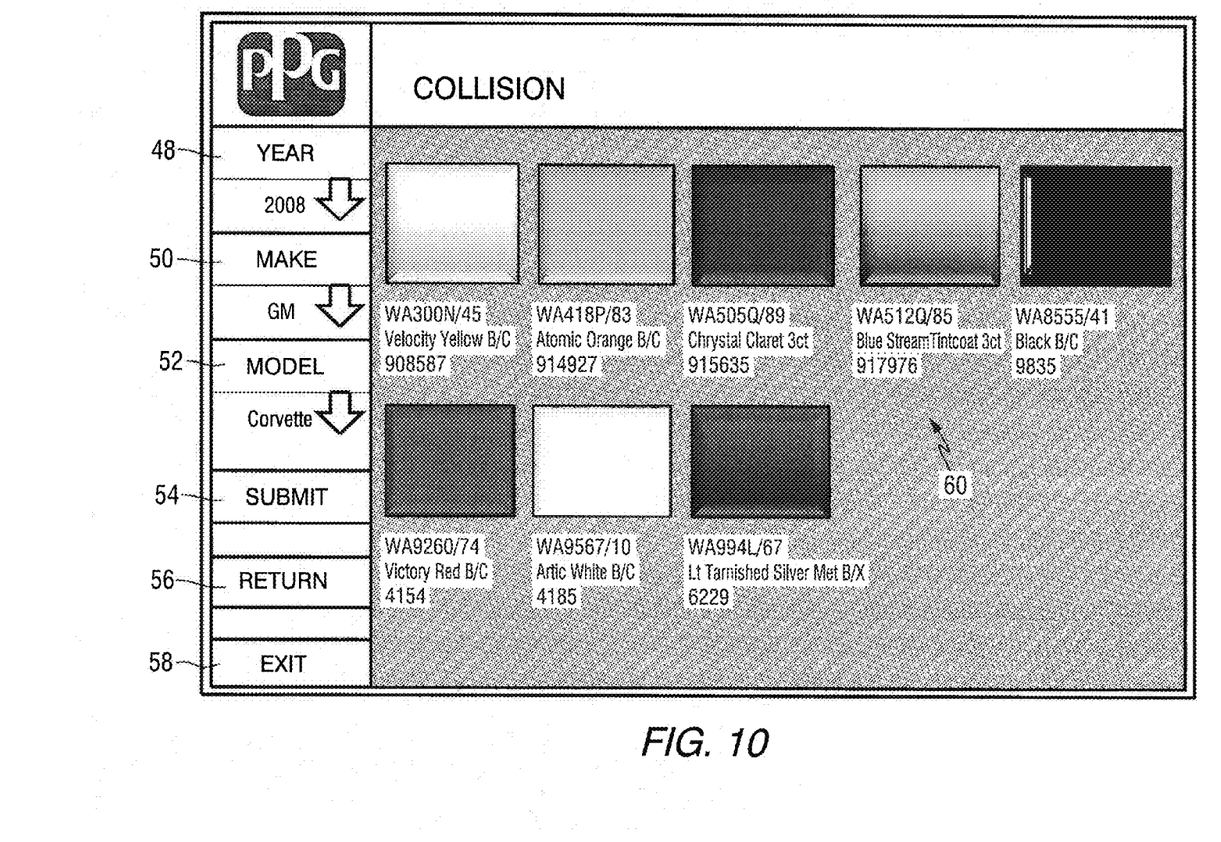

If, for example, Collision was chosen, the user can perform an initial search using drop down boxes 48, 50 and 52 on the left side of FIG. 10. In this example, drop down boxes for year, make, and model are provided. After the search criteria is entered and submitted by clicking on button 54, or contemporaneously with the entry of the search criteria, digital color images 60 for exterior colors identified as meeting the search criteria can appear on the screen. The color images are displayed on a gray background that has been selected as described above. Clicking on one of the color chip images will bring up a screen such as that shown in FIG. 11. A return button 56 allows the user to return to a previous screen, and an exit button 58 allows the user to exit the application.

Figure 11:
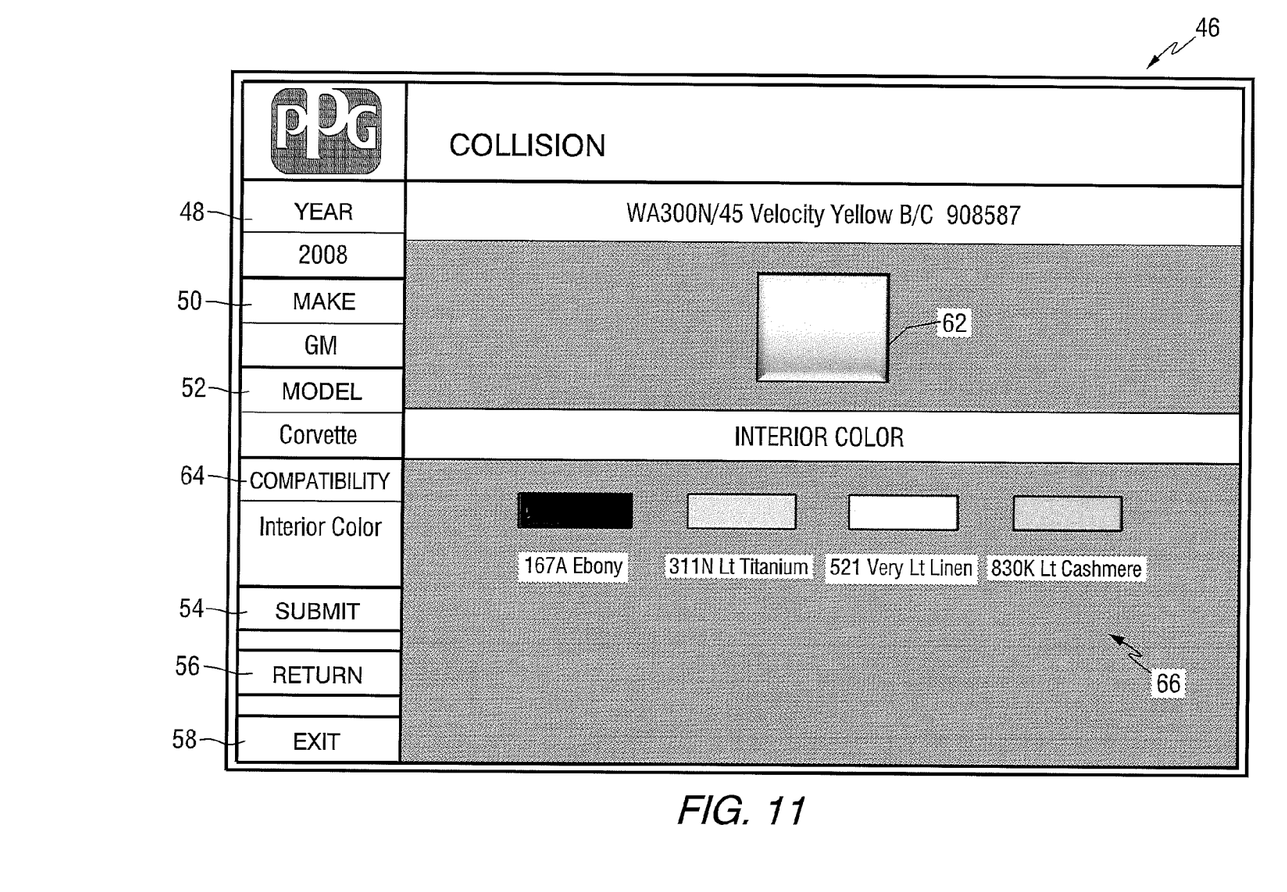

FIG. 11 is a final inspection screen 46 showing the selected color 62 and associated colors 66, such as colors for the interior of the vehicle.

The final inspection screen (FIG. 11) shows the color selected from the screen in FIG. 10, and further includes an additional drop down box 64 for associated information such as but not limited to compatibility information. If compatibility information exists for that search criteria, it will be displayed. If there is no additional information, the compatibility box may not appear or may be grayed out. If the compatibility box is selected, the system will display color chips that meet the compatibility search criteria.

From the screen of FIG. 11, the user can click on a digital color image and can be directed to another website or database of information, where the user can either obtain the paint formula of the selected color, or obtain any technical data, product information, or a location as to where the paint can be obtained.

In another embodiment, the digital color image database may be used in conjunction with a mixing software platform to allow mixing the paint components in one application. In addition, repair orders can be captured and paint selection information can be stored for future use on similar vehicles.

Figure 12:
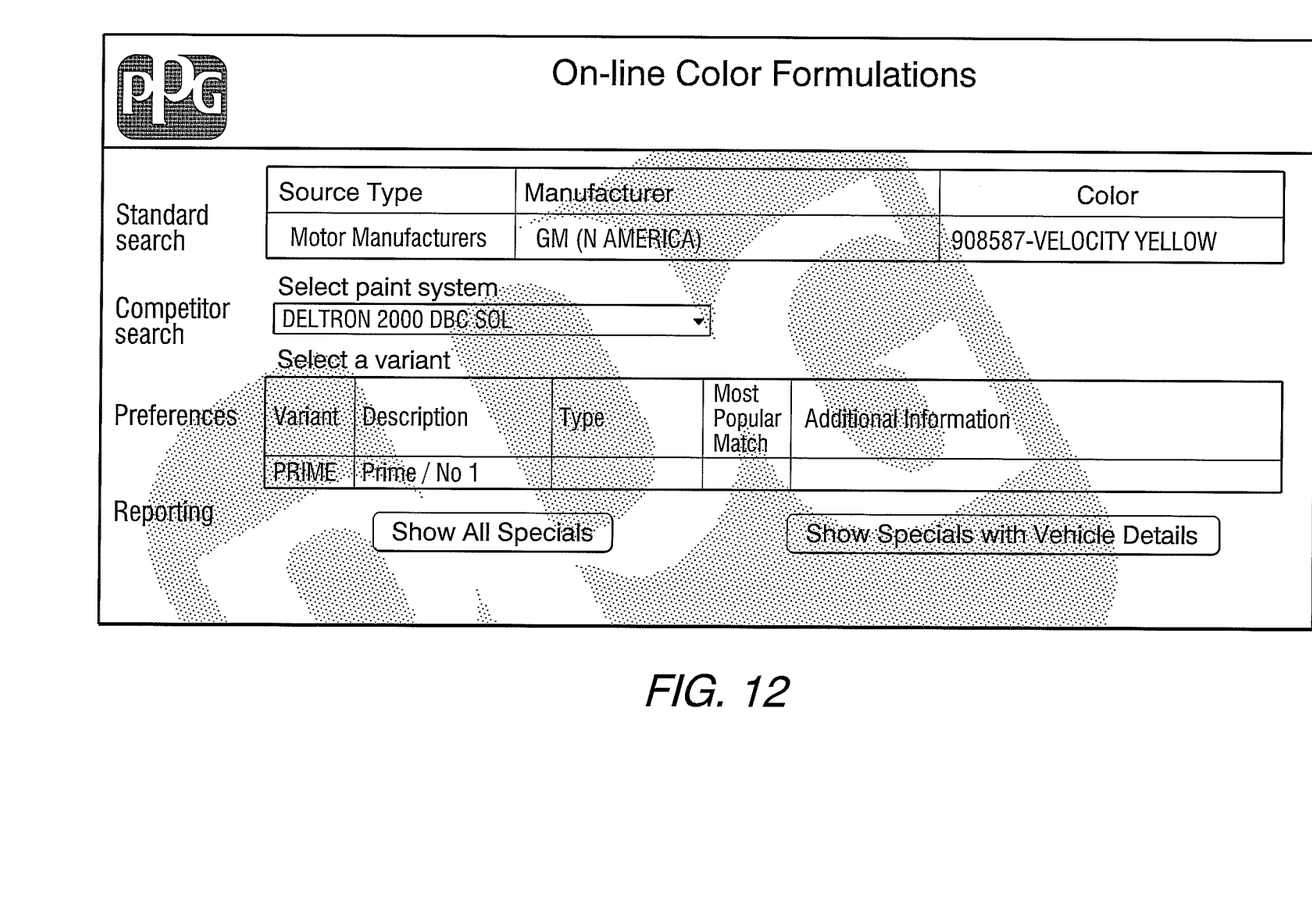

The online tool allows the user to select the body color and request the non-body (e.g., accent, interior, underhood, wheel, etc.) colors and information. The selected color code displayed on screen as a digital color image of the paint chip can be selected to activate a link to the Color Formulation website, as shown by the screen FIG. 12. This allows the user to go from a selected color image to the ancillary information about related colors and to access paint formulas that can then be mixed and sold. If the user does not have security access to the Online Formulations website, a distributor locator box can appear. By entering a postal zip code, the user can initiate a search for, and display of, the nearest paint distributor or store where the user can purchase the paint product.

Utilizing several search criteria, the user may narrow the identification and selection to a small group of digital color images. Selecting a digital color image will produce additional information about that color as well as compatible color information. Digital color images can be arranged chromatically for easier selection. Final selection can link the selected color image to a color formula retrieval tool. Alternatively, final selection can link to the nearest Distributor/Supplier to purchase the paint and ancillary products. Final selection may also link to additional technical information.

Embodiments of the present invention may include one or more of the following features: displaying images of vehicle body paint colors surrounded by a gray background as discussed in US20090295823, incorporated by reference herein in its entirety; utilizing several search criteria to narrow the identification and selection to a small group of digital color images; and selecting a digital color image can produce additional information about that color and/or compatible color information. Digital color images can be arranged chromatically for easier selection, such as by sorting light to dark or by other means. The final selection can link the digital color image to a color formula retrieval tool; or alternatively the final selection can link to the nearest Distributor/Supplier to purchase the paint and ancillary products. In addition, the final selection can link to additional technical information. The correct formula can be selected using the color retrieval software; the formula can be mixed based on the formula retrieved; and the vehicle painted.

The system described above can be used to implement a method including: providing a database of digital representations of colors and metadata relating the colors to vehicle information and color usage; using one or more search criteria to identify one or more of the colors; displaying the identified colors; selecting a color of interest from the displayed colors; using the metadata, search criteria, and/or vehicle information to identify one or more additional colors related to the color of interest; and displaying the selected color and one or more additional colors.

The metadata can include at least one of: color family sorted chromatically, solid, metallic, specialty pigments, and dyes. The vehicle information can include at least one of: original equipment manufacturer, vehicle model, model year, or color code. The color usage can include at least one of: accent, interior, underhood, or wheel. The color of interest can be an exterior vehicle body color and the metadata can identify at least one of: an underhood color, an interior color, a trim color, an accent color, a bumper color, a grille color, a wheel color, multitone and two-tone information, a solid finish effect, or a metallic finish effect.

The method can further include displaying a paint formula for the color of interest and/or additional colors; enabling a link to a color formula retrieval tool, and/or enabling access to a location where paint and/or ancillary products may be purchased.

The search criteria can include at least one of: vehicle manufacturer, vehicle model, model year, an original equipment color code, a brand code, a color family, a finish effect, color usage information, or an application segment. The finish effect can include at least one of: solid or metallic, specialty pigment such as pearlescent and dyes. The application segment can include: collision, custom, motorcycle, historic, fleet, commercial, or other industries.

The method can further include displaying additional information including at least: a paint code label location, a vehicle identification number (VIN), a model assembly plant, a technical data sheet, a material safety data sheet (MSDS), ready to spray information (RTS), volatile organic compound (VOC) information, and product usage about the selected color.

The method can further include using a color visualization tool, in which the selected color can be visualized on a three dimensional representation of a manufactured article including at least one of: a vehicle, a vehicle part, a fender, a gas tank, a spoiler, a cladding, a truck cap, a geometric test panel or a speed shape.

The method can further include mixing paint in the selected color; entering the selected color on a repair order; displaying a link to a color formula retrieval tool; and/or displaying a link to a distributor or supplier where paint and/or ancillary products may be purchased.

As used herein, unless otherwise expressly specified, all numbers such as those expressing values, ranges, amounts or percentages may be read as if prefaced by the word "about," even if the term does not expressly appear. Any numerical range recited herein is intended to include all sub-ranges subsumed therein. Plural encompasses singular and vice versa. For example, while reference is made to "a" color, "a" color image/swatch, "a" formulation and the like, multiple colors, images, swatches or formulations can be selected and/or accessed. When ranges are given, any endpoints of those ranges and/or numbers within those ranges can be combined with the scope of the present invention. "Including," "such as," "for example" and like terms means "including/such as/for example but not limited to." In addition, "vehicle body" is not limited to an OE vehicle, custom vehicle or commercial/fleet vehicle, but rather can refer to any surface to be painted, whether a vehicle or not.

While the invention has been described in terms of several embodiments, it will be apparent to those skilled in the art that various changes can be made to the described embodiments without departing from the scope of the invention.

We claim:

1. An apparatus comprising:
a database including a plurality of digital color images and a neutral gray background value for each of the images;
a processor configured to receive search criteria and to identify one or more of the digital color images meeting the search criteria; and
a display configured to display at least one of the identified digital color images on a neutral gray background, wherein the brightness of the neutral gray background is determined by the neutral gray background value for the image being displayed, and when multiple digital color images are displayed, the neutral gray background is determined by an average of the neutral gray background values for the displayed digital color images.

2. The apparatus of claim 1, wherein the neutral gray background values comprise integers, and when the average includes a fraction, the neutral gray background value corresponding to the integer without the fraction is used in the display.

3. The apparatus of claim 1, wherein the neutral gray background surrounds the displayed digital color image.

4. The apparatus of claim 1, wherein the database further includes metadata relating to vehicle information and color usage; and the processor is configured to receive the search criteria transmitted from a user over a network and to use the metadata to identify one or more additional colors related to the identified digital color images.

5. The apparatus of claim 4, wherein the database includes a plurality of collections of the digital color images and metadata, and wherein the collections comprise at least one of: an image collection, a colors by module collection, a colors by usage collection, and a model/usage compatibility collection.

6. The apparatus of claim 4, wherein the metadata comprises at least one of:
color family, solid, metallic, specialty pigments, or dyes.

7. The apparatus of claim 4, wherein the additional colors comprises at least one of:
accent, interior, underhood, or wheel colors.

8. The apparatus of claim 1, wherein the search criteria comprises at least one of:
vehicle manufacturer, vehicle model, model year, an original equipment color code, a brand code, a color family, a finish effect, color usage information, or an application segment.

9. The apparatus of claim 1, wherein the processor implements a color visualization tool, in which a selected color can be visualized on a three dimensional representation of a manufactured article including at least one of:
a vehicle, a vehicle part, a fender, a gas tank, a spoiler, a cladding, a truck cap, a geometric test panel or a speed shape.

10. An apparatus comprising:
a database including a plurality of digital color images and a neutral gray background value for each of the images;
a processor configured to receive search criteria and to identify one or more of the digital color images meeting the search criteria; and
a display configured to display at least one of the identified digital color images on a neutral gray background, wherein the brightness of the neutral gray background is determined by the neutral gray background value for the image being displayed, and wherein the database further includes a hue number for each of the images, and the hue of the neutral gray background is determined by the hue number for the image being displayed.

11. An apparatus comprising:
a database including a plurality of digital color images and a neutral gray background value for each of the images;
a processor configured to receive search criteria and to identify one or more of the digital color images meeting the search criteria; and
a display configured to display at least one of the identified digital color images on a neutral gray background, wherein the brightness of the neutral gray background is determined by the neutral gray background value for the image being displayed, and wherein the database further includes a chroma value for each of the images, and the chroma of the neutral gray background is determined by the chroma value for the image being displayed.

12. A computer implemented method comprising:
providing a database including a plurality of digital color images and a neutral gray background value for each of the images;
using one or more search criteria to identify one or more of the digital color images; and
displaying at least one of the identified digital color images on a neutral gray background, wherein the brightness of the neutral gray background is determined by the neutral gray background value for the image being displayed, wherein when multiple digital color images are displayed, the neutral gray background is determined by an average of the neutral gray background values for the displayed digital color images.

13. The method of claim 12, wherein the neutral gray background values comprise integers, and when the average includes a fraction, the neutral gray background value corresponding to the integer without the fraction is used in the display.

14. The method of claim 12, wherein the neutral gray background surrounds the displayed digital color image.

15. The method of claim 14, wherein the database includes a plurality of collections of the digital color images, and wherein the collections comprise at least one of:
an image collection, a colors by module collection, a colors by usage collection, and a model/usage compatibility collection.

16. The method of claim 12, wherein the database further includes metadata relating to vehicle information and color usage; and a processor is configured to receive the search criteria transmitted from a user over a network and to use the metadata to identify one or more additional colors related to the identified digital color images.

17. The method of claim 16, wherein the metadata comprises at least one of:
color family, solid, metallic, specialty pigments, or dyes.

18. The method of claim 16, wherein the additional colors comprise at least one of:
accent, interior, underhood, or wheel colors.

19. The method of claim 12, wherein the search criteria comprises at least one of:
vehicle manufacturer, vehicle model, model year, an original equipment color code, a brand code, a color family, a finish effect, color usage information, or an application segment.

20. The method of claim 19, wherein the finish effect comprises at least one of:
solid, metallic, specialty pigment, or dyes.

21. The method of claim 19, wherein the application segment comprises:
collision, custom, motorcycle, historic, fleet, commercial, or other industries.

22. The method of claim 12, further comprising:
selecting a color of interest from the displayed colors;
using metadata, the search criteria, and/or vehicle information to identify one or more additional colors related to the color of interest; and
displaying the selected color and one or more additional colors.

23. The method of claim 22, further comprising:
displaying a paint formula for the color of interest and/or additional colors.

24. The method of claim 22, further comprising:
displaying additional information including at least:
a paint label location, a vehicle identification number (VIN), a model assembly plant, a technical data sheet, a material safety data sheet (MSDS), ready to spray information (RTS), volatile organic compound (VOC) information, and product usage about the selected color of interest.

25. The method of claim 22, further comprising:
using a color visualization tool, in which the selected color of interest can be visualized on a three dimensional representation of a manufactured article including at least one of:
a vehicle, a vehicle part, a fender, a gas tank, a spoiler, a cladding, a truck cap, a geometric test panel or a speed shape.

26. The method of claim 22, further comprising:
mixing paint in the selected color of interest.

27. The method of claim 22, wherein the selected color of interest is entered on a repair order.

28. The method of claim 12, further comprising:
enabling a link to a color formula retrieval tool.

29. The method of claim 12, further comprising:
enabling access to a location where paint and/or ancillary products may be purchased.

30. The method of claim 12, further comprising:
displaying a link to a color formula retrieval tool.

31. The method of claim 12, further comprising:
displaying a link to a distributor or supplier where paint and/or ancillary products may be purchased.

32. A computer implemented method comprising:
providing a database including a plurality of digital color images and a neutral gray background value for each of the images;
using one or more search criteria to identify one or more of the digital color images; and
displaying at least one of the identified digital color images on a neutral gray background, wherein the brightness of the neutral gray background is determined by the neutral gray background value for the image being displayed, and wherein the database further includes a hue number for each of the images, and the hue of the neutral gray background is determined by the hue number for the image being displayed.

33. A computer implemented method comprising:
providing a database including a plurality of digital color images and a neutral gray background value for each of the images;
using one or more search criteria to identify one or more of the digital color images; and
displaying at least one of the identified digital color images on a neutral gray background, wherein the brightness of the neutral gray background is determined by the neutral gray background value for the image being displayed, and wherein the database further includes a chroma value for each of the images, and the chroma of the neutral gray background is determined by the chroma value for the image being displayed.

* * * * *